(12) United States Patent
Jerome et al.

(10) Patent No.: US 6,375,821 B1
(45) Date of Patent: Apr. 23, 2002

(54) METHOD FOR COATING ELECTRICALLY CONDUCTIVE PARTICLES BY GRAFTING A POLYMER LAYER

(75) Inventors: Robert Jerome, Sart-Jalhay; Lucien Martinot, Olne; Marc Mertens, Spa; Isabelle Bodart, Saint-Georges-sur-Meuse; Philippe Dubois, Ciplet, all of (BE)

(73) Assignee: Cipari S.A., Luxembourg (BE)

( * ) Notice: Subject to any disclaimer, the term of this patent is extended or adjusted under 35 U.S.C. 154(b) by 0 days.

(21) Appl. No.: 09/529,643
(22) PCT Filed: Oct. 22, 1998
(86) PCT No.: PCT/BE98/00158
  § 371 Date: Jun. 19, 2000
  § 102(e) Date: Jun. 19, 2000
(87) PCT Pub. No.: WO99/20697
  PCT Pub. Date: Apr. 29, 1999

(30) Foreign Application Priority Data

Oct. 22, 1997 (BE) ............................................. 9700845

(51) Int. Cl.[7] .............................. C25D 9/02; C25D 13/08
(52) U.S. Cl. ........................ 205/83; 204/472; 204/499; 204/512; 205/104; 205/144; 205/149; 205/159; 205/235; 205/317
(58) Field of Search .......................... 205/83, 104, 144, 205/149, 159, 235, 317; 204/472, 499, 512

(56) References Cited

U.S. PATENT DOCUMENTS 4,908,106 A * 3/1990 Takeshima et al. ............. 204/23

FOREIGN PATENT DOCUMENTS

| EP | 0 106 352 A | 4/1984 | ........... C25D/13/08 |
| EP | 0 193 978 A | 9/1986 | ........... C25D/13/08 |

* cited by examiner

Primary Examiner—Kathryn Gorgos
Assistant Examiner—William T. Leader
(74) Attorney, Agent, or Firm—Michael Best & Friedrich LLC; J. Warren Whitesel (57) ABSTRACT

The invention concerns a method for forming a coating on conductive particles by grafting a polymer and/or a copolymer of the particles from a bath containing at least a monomer from which the polymer and/or copolymer is formed. The method consists of producing the grafting by electrochemical reduction of the monomer in an electrolytic solution, where at least a cathode and an anode are provided, and containing an aprotic solvent, a support electrolyte and the monomer(s) required for polymerizing or copolymerizing the coating, by suspending the particles and moving the solution so as to produce an intermittent contact between the particles and the cathode, and to form, by polymerization or copolymerization, the coating on the particles by applying an electric potential.

9 Claims, 6 Drawing Sheets

METHOD FOR COATING ELECTRICALLY CONDUCTIVE PARTICLES BY GRAFTING A POLYMER LAYER

The present invention relates to a process for forming a coating on conductive particles by grafting a polymer and/or copolymer onto these particles using a bath containing at least one monomer from which the polymer and/or copolymer is formed. The expression "conductive particle" applies equally well to powders, granules and short fibres as to objects of any shape and relatively small size.

The production of composites comprising a polymer matrix in which electrically conductive particles are uniformly dispersed is limited at the present time by the instability of the conductive filler/polymer interface. To alleviate this drawback, several processes involve precoating the fillers with an organic component which will ensure, at least partially, that the particles are bonded to the polymer matrix of the composite.

In fact, this approach provides only a very limited solution to the stability of the final composite since the problem of conductive particle/polymer matrix adhesion is transferred to the conductive particle/coating layer interface.

An improvement to the known processes has in particular been described in 1995 by N. Tsubokawa and S. Hayashi (J.M.S.—Pure Appl. Chem., 1995, A32, 525–535) which relates to the chemical grafting of polymers onto a carbon powder preoxidized by nitric acid, so as to form OH, COOH and C=O functional groups on the surface. The grafting of the polymer takes place in two steps: grafting of the functional group, then chemical bonding of the polymer. The grafting of the polymer is not controllable since the density of grafted chains is limited by the surface density of the functional groups, which is random moreover. The attachment of the polymer is not really stable since, in some cases, it is the hydrolysable "ester" functional groups which provide the graphite/polymer bond. Finally, these authors use either monomers whose polymerization is initiated by the grafted functional group, or already formed polymer chains whose size limits the accessibility to the substrate.

One of the essential aims of the present invention is to remedy the drawbacks of the known coating processes and to present a process making it possible to form a coating on electrically conductive particles which adheres perfectly and uniformly, so that these particles thus coated or encapsulated are particularly suitable for the manufacture of composites filled with such conductive particles.

The object of the process according to the invention is therefore to cover the particles with a stable polymer layer capable of dispersing them in a stable and homogeneous manner in a conductive or non-conductive polymer matrix provided that, of course, measures are taken to ensure that this matrix and the polymer coating the particles are miscible, or even mutually reactive.

For this purpose, according to the invention, the grafting is carried out by electrochemical reduction of the said monomer in an electrolysis bath in which at least one cathode and one anode are provided and which contains an aprotic solvent, an electrolyte support and the monomer or monomers required to form, by polymerization or copolymerization, the coating, by putting the particles into suspension in the abovementioned bath and by making them move therein, so as to create intermittent contact between the said particles and the cathode, and to form, by polymerization or copolymerization, the coating on the particles by applying a potential or a current which drives the reaction system into a passivation region corresponding to the inhibition peak detected by voltammetry, the cathode remaining insensitive to the said polymerization or copolymerization during application of the abovementioned potential or current.

Further details and features of the invention will emerge from the description given below, by way of non-limiting examples, of a few particular ways of implementing the process according to the invention, with reference to the appended drawings.

BRIEF DESCRIPTION OF THE DRAWINGS

In the various figures, the same reference numbers relate to the same elements.

In general, the process according to the invention differs from the prior art by the combination of the following points:

direct electrochemical grafting of the polymer onto the conductive substrate, that is to say with no intermediate link;

the grafting takes place only under strict control of the applied potential;

intermittent contact between the particles to be covered and the working electrode (cathode), which remains inert with respect to the grafting.

In fact, the proposed process is characterized by electrografting of a monomer unit which then acts as a polymerization-initiating entity.

More particularly, according to the invention, it has proved possible, in an unpredictable way given the prior art relating to the coating of conductive particles with a polymer, to obtain such a perfectly stable and homogeneous coating in an electrolysis bath containing the monomer, an aprotic solvent and an electrolyte support, by electrochemical reduction of this monomer, induced during intermittent contact between the said particles and a cathode placed in this bath, as long as a well-defined potential or current is applied to the cathode and as long as the latter remains insensitive to the polymerization of the monomer during application of this well-defined potential or current.

Figure 1:
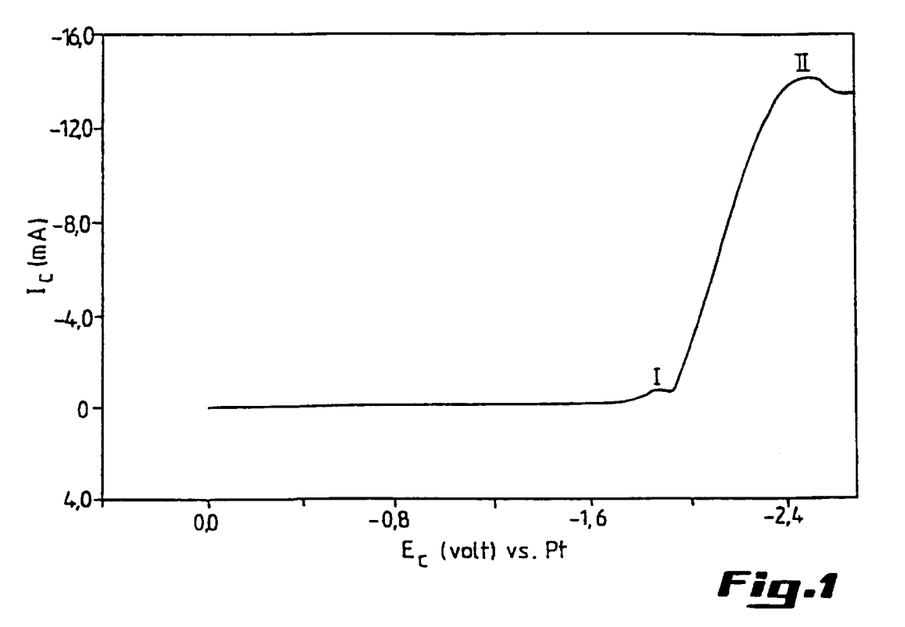
FIG. 1 shows, by way of example, the passivation region on a typical voltammogram of a cathode of the same kind as that of the particles to be covered.

This is because, as shown in FIG. 1, before the reduction of the solvent or of the cation of the electrolyte support, two separate potential and current peaks are observed, namely a peak I and a peak II. It has been found that grafting and polymerization of the monomer at the surface of the conductive particles in contact with the cathode occur around peak I. If the potential applied to the cathode does not exceed this value, it has been found, unpredictably, that these particles are effectively covered with a thin film of grafted polymer. If the particles are formed from carbon, there will therefore be continuity between the carbon and the polymer.

Thus, the electrolysis of a solution formed from acrylonitrile in an aprotic solvent (acetonitrile) in the presence of an electrolyte support ($Et_4NClO_4$) results in a film of polyacrylonitrile (PAN) being grafted onto the conductive particles, formed for example from carbon. The PAN film formed under the electrolysis conditions defined above is insoluble in dimethylformamide (DMF) which is a good solvent for PAN. On the other hand, around the second peak II, a thick PAN film forms which is completely soluble in DMF.

Application of the process according to the invention therefore requires refined control of the electrolysis conditions: it is necessary to work only in the region of peak I (the inhibition peak) in order to obtain homogeneous grafting of the polymer onto the cathode. In practice, this condition can be achieved using two techniques, namely potentiostatic electrolysis, in which the cathode potential is set, with respect to a reference electrode, in the region of peak I and galvanostatic electrolysis, in which the polymerization current is set to a value below the maximum current (ip) defined in voltammetry. The current density is adjusted depending on the mean diameter of the particles to be coated and on the dynamic stirring conditions, so as not to exceed a current corresponding to the first peak I with respect to the fixed electrode.

The originality of the process is the formation of intermittent contacts between conductive particles to be covered and a fixed cathode chosen from a conductive material onto which it is impossible to graft a polymer using the process according to the invention. Without restriction, zinc, tin or even silicon carbide (SiC) may be used as the cathode in the process. Intermittent contact is provided by bringing the particles into transient contact with the cathode either by the usual process of stirring a liquid, such as one using a propeller stirrer, a magnetic stirrer, or an ultrasonic field, or by a mechanical movement of the cathode, such as rotation, oscillation or vibration. It is also possible to use an enveloping cathode, able to serve as the electrolysis tank and itself undergoing a movement. Under the dynamic stirring conditions, each particle statistically comes into contact with the working electrode in renewed spatial orientations. At each contact, the monomer is polarized and an electron transfer contact with the electrode is transiently established: this step is the necessary and sufficient condition for the polymerization to be able to start. After this initiation, the stirring returns the particle to the solution, where the polymerization will continue chemically since the monomer is available in the solution. During this polymerization step, the polarization of the cathode no longer has any effect around the particle. The latter has not necessarily been covered in its entirety during the first contact with the cathode, but it will be able to be so during subsequent contacts between the uncovered parts of the particle and the cathode, which still remains polarized under the potential conditions specified above.

According to the invention, several monomers are able to be grafted at the first peak, but the monomer/solvent pair must be chosen judiciously. By way of non-limiting example, mention should be made of the following systems: acrylonitrile/acetonitrile, acrylonitrile/dimethylacetamide, acrylonitrile/N,N-dimethylformamide, acrylonitrile/pyridine, ethyl acrylate/N,N-dimethylformamide, ethyl acrylate/pyridine, 2-trimethylsilyloxyethyl methacrylate/N,N-dimethylformamide, methyl methacrylate/N,N-dimethylformamide, tert-butyl acrylate/N,N-dimethylformamide, n-butyl acrylate/N,N-dimethylformamide, allyl methacrylate/N,N-dimethylformamide and glycidyl methacrylate/N,N-dimethylformamide. All these solvents belong to the class of aprotic solvents in which grafting is possible. The choice of electrolyte support has, in principle, no fundamental influence on the grafting, but it is preferable to use an electrolyte support which does not bring residual water from the solvent into the double layer of the coating formed on the particles.

Figure 2:
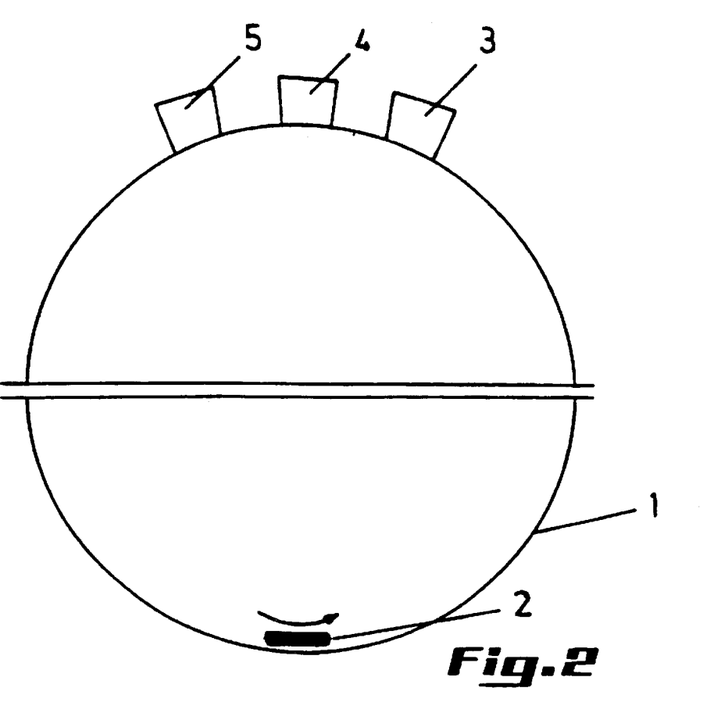
FIG. 2 is a schematic elevation of an electrochemical cell allowing the process according to the invention to be carried out, the electrodes in the cell having been omitted.
Figure 3:
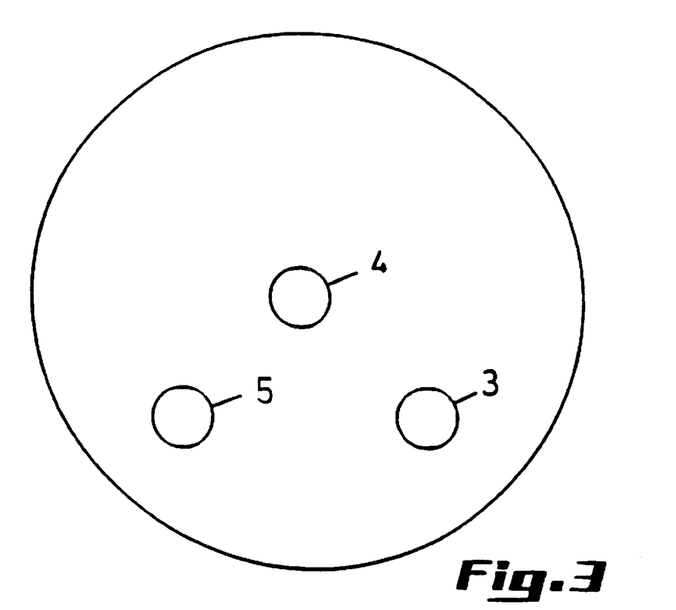
FIG. 3 is a top view of this same cell.
Figure 4:
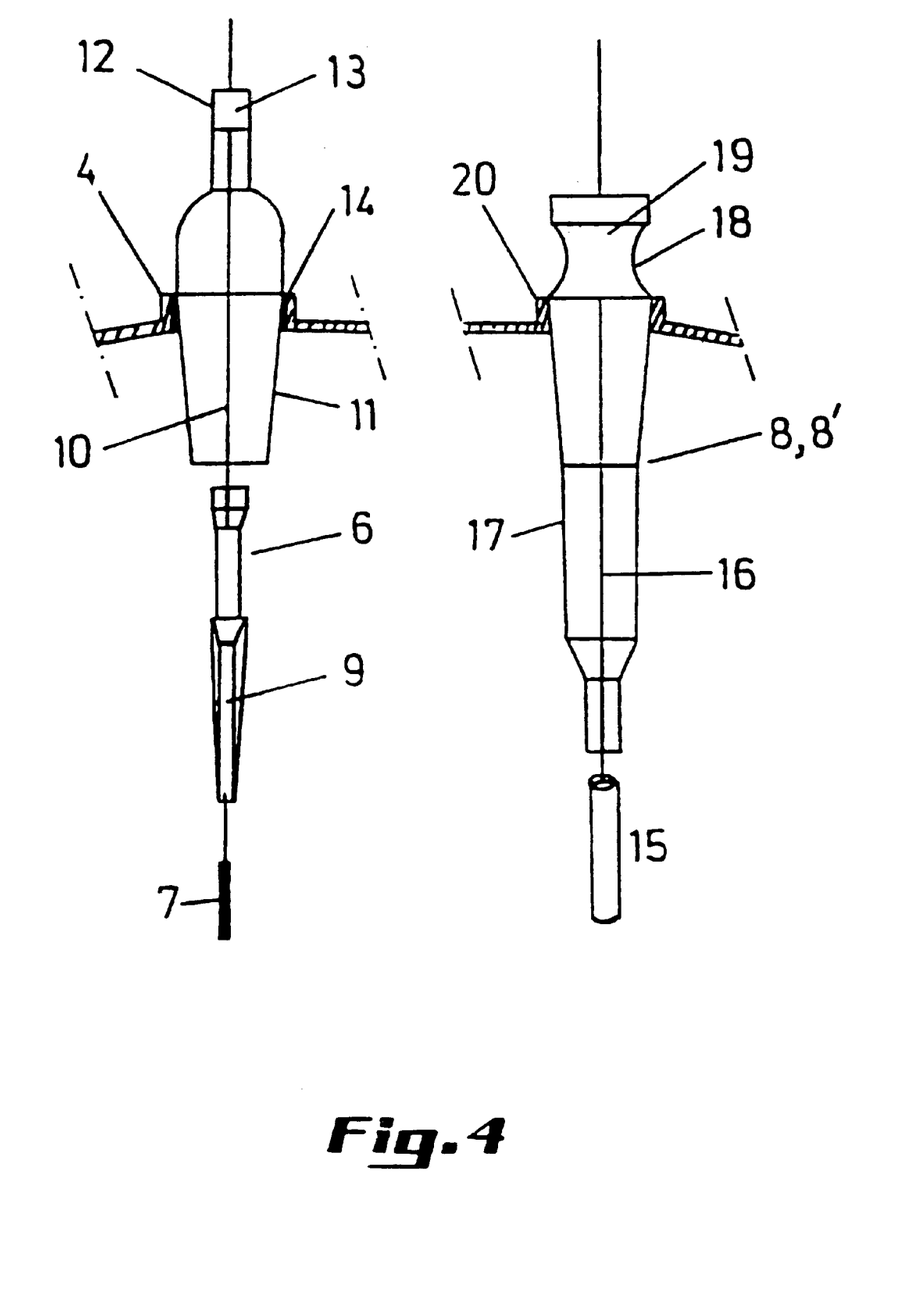
FIG. 4 is a vertical partial section, on a larger scale, of two electrodes fitted into the cell of the previous figures.

The shape and the volume of the electrolysis cell used for carrying out the process according to the invention are determined by the nature of the particles to be covered and by the choice of the type of intermittent particle/cathode contact. The electrolysis cell, as illustrated in FIGS. 2 to 4, comprises a vessel 1 containing a solution formed from a solvent, from a monomer or from a mixture of comonomers, from an electrolyte and from conductive particles in suspension. Provided in the bottom of this vessel 1 is a bar magnet 2, which rotates about a vertical spindle, thus ensuring that the solution is homogeneous and that the conductive particles to be coated with a polymer are set in motion.

The upper part of this vessel 1 has three internally ground conical housings 3, 4 and 5 from which electrodes, for example a central working electrode 6, a counterelectrode 8 and a reference electrode 8', are suspended.

Figure 5:
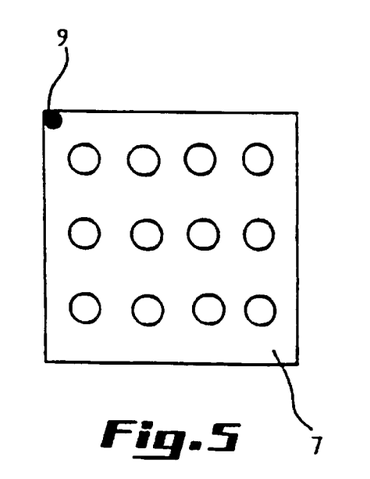
FIG. 5 is a front view of a plate forming the working cathode in the embodiment according to FIG. 4.

These electrodes are shown in greater detail in FIG. 4. The working electrode 6 includes, at its free end, a small plate (50×50 mm with a thickness of 0.5 mm), for example made of zinc, which is perforated as shown in detail in FIG. 5. The number of holes and their diameter are not critical as long as there is free circulation of the suspension and the particle/zinc contact time is long enough to allow the particles to be polarized to the potential applied to the cathode. This plate 7 is suspended by a clip 9 from a conductor 10 which extends inside, along the spindle, of a glass sleeve 11, the upper opening 12 of which is closed by an epoxy adhesive plug 13. The sleeve 11 has a ground conical outer wall 14 which fits in a substantially sealed manner in the housing 4 in the vessel 1.

The reference electrode 8' and the counterelectrode 8 have the same construction and comprise a platinum foil wound in the form of a cylinder 15 having an area of the order of 10 $cm^2$. This cylinder 15 is suspended from a conductor 16 which extends along the spindle of a glass sleeve 17 closed at its upper end 18 by an epoxy adhesive plug 19.

As in the case of the electrode 6, the electrodes 8 and 8' have a conical outer wall 20 which fits in a sealed manner into the corresponding housings 3 and 5 in the vessel 1.

In a variant, the working electrode 7 may, for example, be formed by a bar of silicon carbide, for example 2 mm in diameter and 2 cm in length, or else by a bar of tin.

The counterelectrode providing the flow of current must be inert: it is made, for example, of platinum or of glassy carbon. If electrolysis in potentiostatic mode is preferred, the reference electrode is either a standard electrode for organic media ($Ag/AgClO_4$/solvent) or a platinum pseudo-reference electrode.

The manipulations are carried out in an atmosphere protected from oxygen and from water, the atmosphere having, for example, a water content of about 5 to 50 ppm.

The specific illustrative examples given below, which apply to an electrolysis cell of the type shown in FIGS. 2 to 5 and described above, allow the process according to the invention to be illustrated further.

EXAMPLE 1

Grafting of Polyethyl Acrylate (PEA) onto Graphite Carbon Powder

In this example, the grafting and the electropolymerization of ethyl acrylate (EA) are carried out on the surface of graphite particles. Electrical contact is provided by a silicon carbide (SiC) electrode. The electrochemical technique used is chronopotentiometry.

The electrolysis bath is based on the following constituents:
- 150 ml of DMF dried over $P_2O_5$ for 72 hours and then distilled under reduced pressure;
- 1.9 g of $Et_4NClO_4$ (electrolyte support) dried in vacuo at 80° C. for 24 hours;
- 37.5 ml of EA dried over $CaH_2$ for 48 hours and then distilled under reduced pressure;
- 0.35 g of graphite carbon powder.

An SiC bar (the cathode), a counterelectrode and a pseudo-reference electrode (both the latter being made of platinum) are immersed in the electrolysis solution. A constant current of $-15\ \mu A$ with respect to the pseudo-reference electrode is applied to the SiC bar for 90 minutes. The carbon is polarized by stirring the dispersion, using a magnetic stirrer. After electrolysis, the carbon is separated by centrifuging and then washed several times with a solvent for the polymer, so as to dissolve any polymer that was not grafted. The presence of grafted PEA is demonstrated macroscopically by the agglomeration of polymer-coated particles even after many extractions with a good solvent for PEA.

EXAMPLE 2

Grafting Polyethyl Acrylate (PEA) onto Graphite Carbon Powder

In this example, the grafting and the electropolymerization of ethyl acrylate (EA) are also carried out on the surface of graphite particles. Electrical contact is provided by a zinc (Zn) electrode. The electrochemical technique used is chronoamperometry. The electrolysis bath is based on the following constituents:
- 150 ml of DMF dried over $P_2O_5$ for 72 hours and then distilled under reduced pressure;
- 1.9 g of $Et_4NClO_4$ (electrolyte support) dried in vacuo at 80° C. for 24 hours;
- 40 ml of EA dried over $CaH_2$ for 48 hours and then distilled under reduced pressure;
- 0.2 g of graphite carbon powder.

A 5 cm×5 cm Zn plate (the cathode), a counterelectrode and a pseudo-reference electrode (both the latter being made of platinum) are immersed in the electrolysis solution. A constant potential of $-1.7$ V with respect to the pseudo-reference electrode is applied to the Zn electrode for 21 hours; this potential corresponds to the potential of the first peak. The carbon is polarized by stirring the solution. The presence of PEA is demonstrated macroscopically, as described in the first example. The percentage by weight of polymer grafted onto the powder is determined by TGA (thermal gravimetric analysis) and represents 28% of the total weight of the composite.

EXAMPLE 3

Grafting of Polyacrylonitrile (PAN) onto Graphite Carbon Powder

In this example, the grafting and the electropolymerization of acrylonitrile (AN) are also carried out on the surface of graphite particles. Electrical contact is provided by a 50×50 mm zinc (Zn) electrode pierced with holes 2 mm in diameter. The electrochemical technique used is chronoamperometry. The electrolysis bath is based on the following constituents:
- 225 ml of DMF dried over $P_2O_5$ for 72 hours and then distilled under reduced pressure;
- 2.8 g of $Et_4NClO_4$ (electrolyte support) dried in vacuo at 80° C. for 24 hours;
- 35 ml of AN dried over $CaH_2$ for 48 hours and then distilled under reduced pressure;
- 1.6 g of graphite carbon powder.

Figure 6:
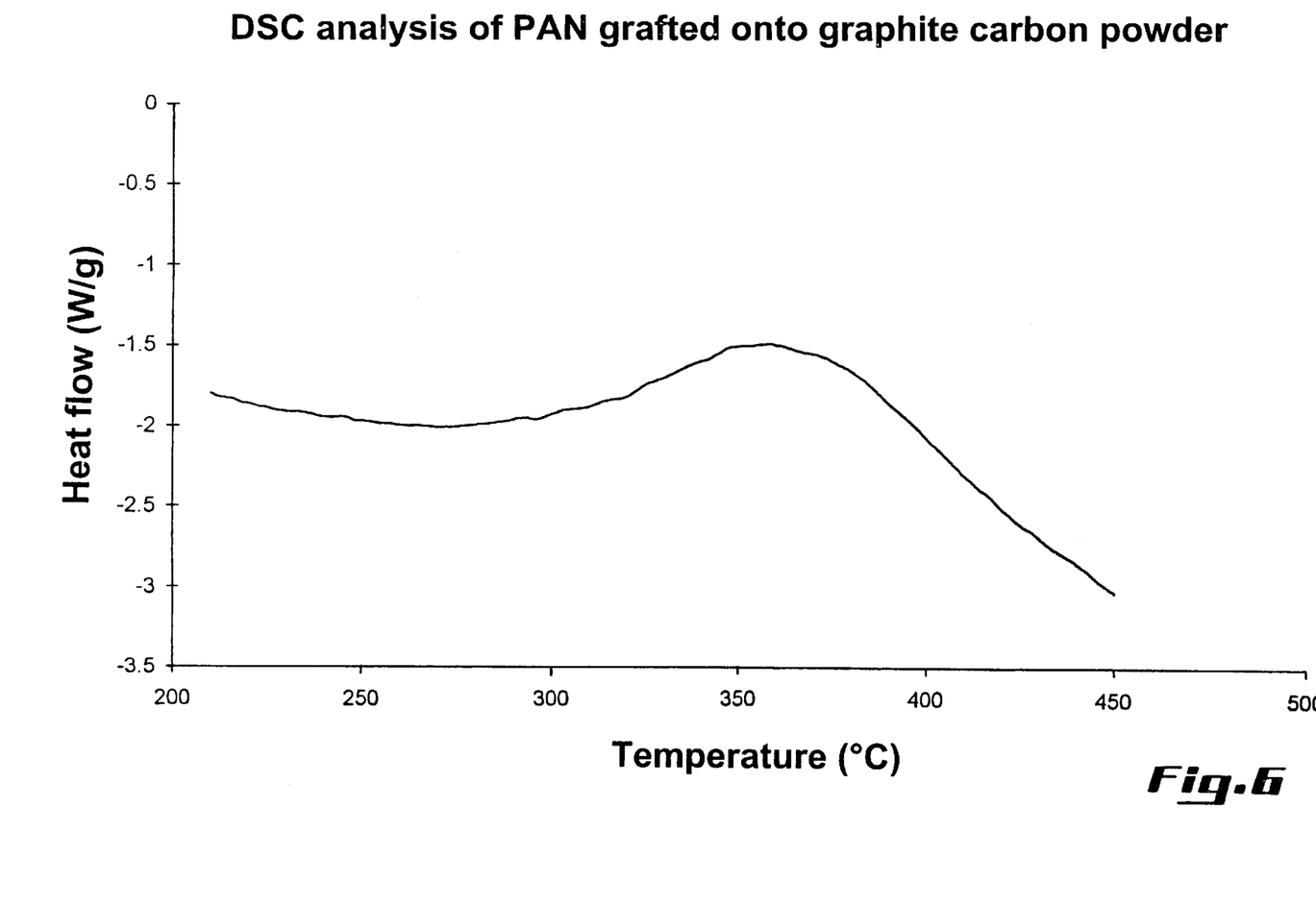
FIG. 6 is a graph showing an endotherm specific to the cyclization of polyacrylonitrile on a graphite carbon powder.

A constant potential of $-1.7$ V with respect to the pseudo-reference electrode is applied to the Zn electrode for 21 hours. The carbon is polarized by stirring the solution. Next, the carbon is washed several times with DMF, a solvent for PAN, so as to extract the PAN that was not grafted. The presence of PAN is then demonstrated by DSC (differential scanning calorimetry) in the form of an endotherm specific to the cyclization of PAN (FIG. 6). The percentage by weight of the grafted polymer, determined by TGA (thermal gravimetric analysis), is 15% with respect to the total weight of the composite.

EXAMPLE 4

Grafting of Polyacrylonitrile (PAN) and of Polyethyl Acrylate (PEA) onto Carbon Black In this example, the kinetics of grafting PAN and PEA onto the surface of the carbon black are compared. Electrical contact is provided by a zinc (Zn) electrode pierced with holes 2 mm in diameter. The electrochemical technique used is chronoamperometry. The electrolysis baths are based on the following constituents:
1) AN bath:
   - 100 ml of DMF dried over $P_2O_5$ for 72 hours and then distilled under reduced pressure;
   - 1.15 g of $Et_4NClO_4$ (electrolyte support) dried in vacuo at 80° C. for 24 hours;
   - 15 ml of AN dried over $CaH_2$ for 48 hours and then distilled under reduced pressure;
   - 2.25 g of XE2-type carbon black (from Degussa);
2) EA bath:
   - 100 ml of DMF dried over $P_2O_5$ for 72 hours and then distilled under reduced pressure;
   - 1.15 g of $Et_4NClO_4$ (electrolyte support) dried in vacuo at 80°C. for 24 hours;
   - 27 ml of EA dried over $CaH_2$ for 48 hours and then distilled under reduced pressure;
   - 2 g of XE2-type carbon black (from Degussa).

Figure 7:
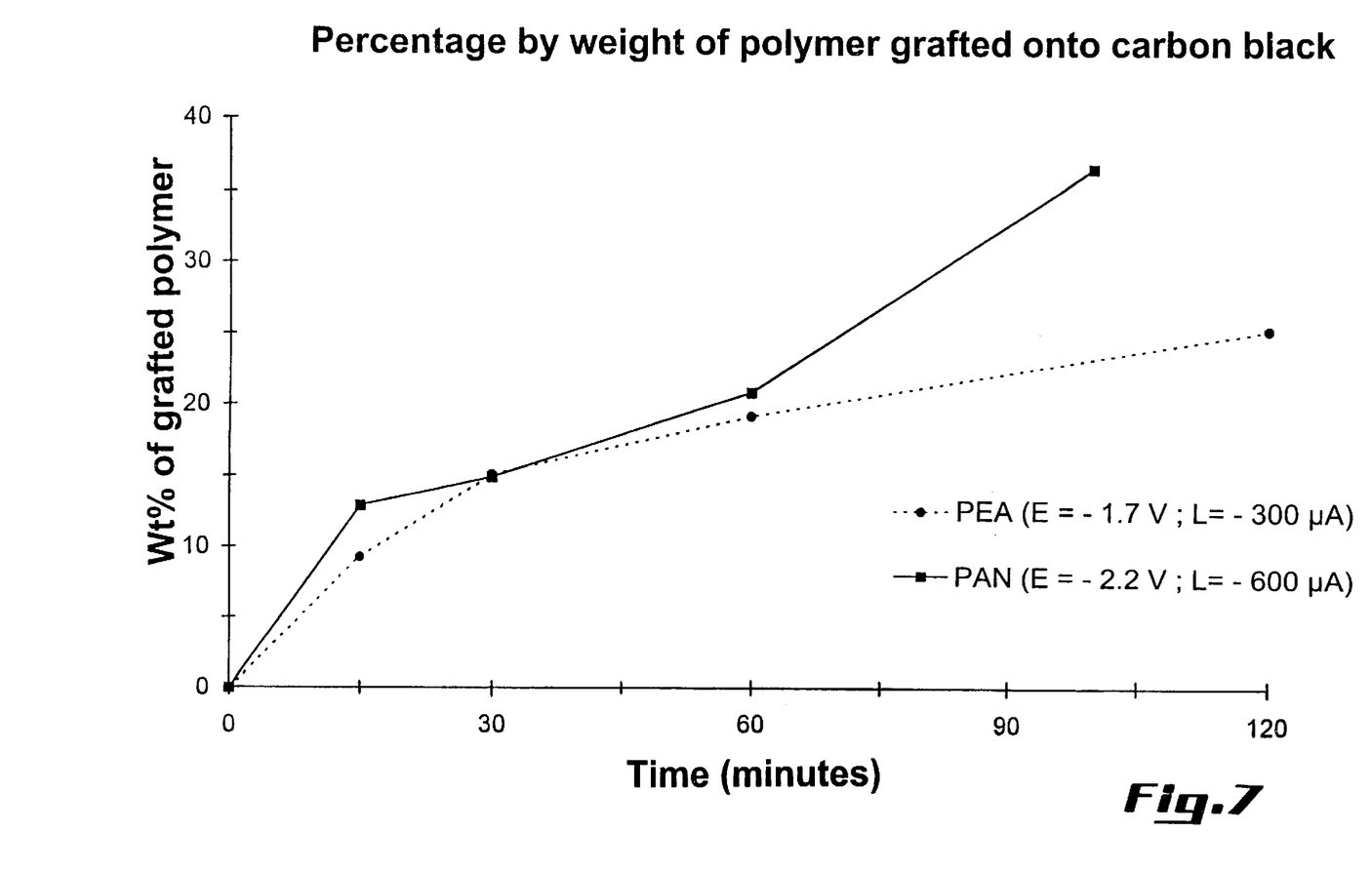
FIG. 7 is a graph showing the percentage by weight of polymer grafted onto carbon black as a function of the electrolysis time.

A 5 cm×5 cm Zn plate pierced over its entire area with holes 2 mm in diameter (the cathode), a counterelectrode and a pseudo-reference electrode (both the latter being made of platinum) are immersed in the electrolysis solutions. A constant potential of $-2.2$ V (first peak) with respect to the pseudo-reference electrode is applied to the Zn electrode for 15, 30, 60 and 100 minutes in the AN bath, and a potential of $-1.7$ V (first peak) with respect to the pseudo-reference electrode is applied to the Zn electrode for 15, 30, 60 and 120 minutes in the EA bath. The carbon is polarized by stirring the solution. The various carbon specimens are then washed several times with DMF, a solvent for PAN and for PEA, so as to extract any non-grafted polymer. The grafted PEA specimen is also stripped of any non-grafted PEA by extraction using THF in a Soxhlet apparatus. The percentage by weight of the grafted polymers is determined by TGA (thermal gravimetric analysis). FIG. 7 shows the percentage by weight of polymer grafted onto carbon black as a function of the electrolysis time.

EXAMPLE 5

Grafting of Polyethyl Acrylate (PEA) onto Carbon Black and onto Graphite Carbon Powder In this example, the kinetics of grafting PEA onto the surface of the carbon black and onto the graphite carbon powder are compared. Electrical contact is provided by a zinc (Zn) electrode pierced with holes 2 mm in diameter. The electrochemical technique used is chronoamperometry. The electrolysis baths are based on the following constituents:

1) Carbon black bath:
   100 ml of DMF dried over $P_2O_5$ for 72 hours and then distilled under reduced pressure;
   1.15 g of $Et_4NClO_4$ (electrolyte support) dried in vacuo at 80° C. for 24 hours;
   27 ml of EA dried over $CaH_2$ for 48 hours and then distilled under reduced pressure;
   2 g of carbon black of the XE2-type (from Degussa);
2) Graphite carbon powder bath:
   110 ml of DMF dried over $P_2O_5$ for 72 hours and then distilled under reduced pressure;
   1.27 g of $Et_4NClO_4$ (electrolyte support) dried in vacuo at 80°C. for 24 hours;
   30 ml of EA dried over $CaH_2$ for 48 hours and then distilled under reduced pressure;
   5.2 g of graphite carbon powder.

Figure 8:
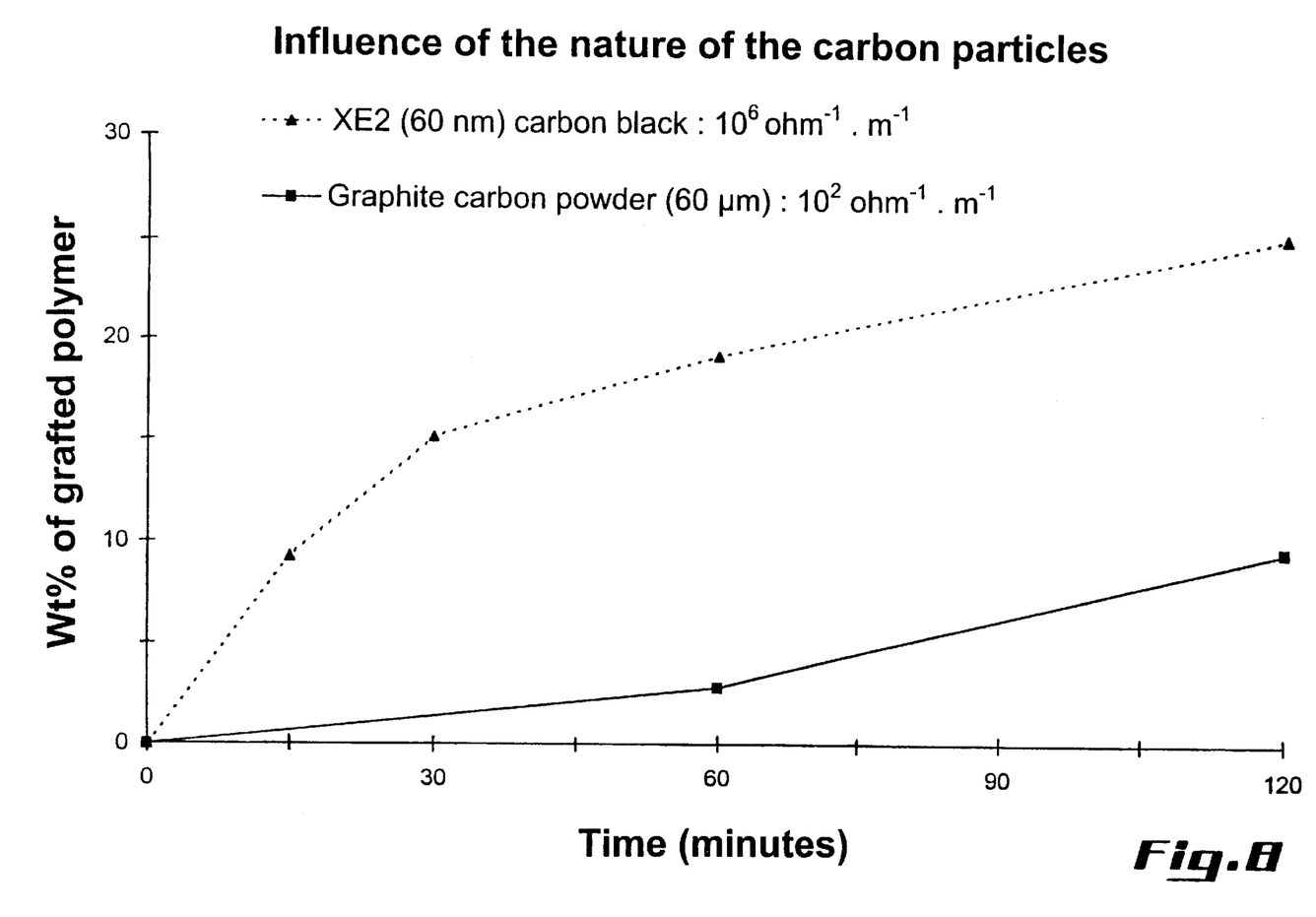
FIG. 8 is a similar graph to that in FIG. 7, relating to two different types of carbon particle.

A 5 cm×5 cm Zn plate pierced over its entire area with holes 2 mm in diameter (the cathode), a counterelectrode and a pseudo-reference electrode (both the latter being made of platinum) are immersed in the electrolysis solutions. A constant potential of −1.7 V (first peak) with respect to the pseudo-reference electrode is applied to the Zn electrode for 15, 30, 60 and 120 minutes in each of the electrolysis baths. Both types of carbon particle are polarized by stirring the solutions. The various carbon specimens are then washed several times with DMF and with THF, both solvents for PEA, so as to extract the polymer which was not grafted. The percentage by weight of grafted polymers is determined by TGA (thermal gravimetric analysis). FIG. 8 shows the percentage by weight of polymer grafted onto the carbon black and onto the carbon powder as a function of the electrolysis time. The influence of the nature of the carbon particles on the grafting rate should be noted.

EXAMPLE 6

Grafting of Polyacrylonitrile (PAN) onto Metal Powder

In this example, the grafting of PAN is carried out on the surface of a nickel metal powder. Electrical contact is provided by a zinc (Zn) electrode pierced with holes 2 mm in diameter. The electrochemical technique used is chronoamperometry. The electrolysis bath is based on the following constituents:

108 ml of DMF dried over $P_2O^5$ for 72 hours and then distilled under reduced pressure;
1.24 g of $Et_4NClO_4$ (electrolyte support) dried in vacuo at 80° C. for 24 hours;
17 ml of AN dried over $CaH_2$ for 48 hours and then distilled under reduced pressure;
5.12 g of nickel particles (INCO, type 110).

A constant potential of −1.7 V (the potential of the first peak), with respect to the pseudo-reference electrode, is applied to the Zn electrode for 30 minutes. The metal particles are polarized by stirring the solution. The carbon is then washed several times with DMF, a solvent for PAN, so as to extract the non-grafted PAN. The percentage by weight of grafted polymer, determined by TGA (thermal gravimetric analysis), is 10%.

EXAMPLE 7

Grafting of Polyethyl Acrylate (PEA) onto Short Carbon Fibres

In this example, the grafting and the electropolymerization of ethyl acrylate (EA) are carried out on short carbon fibres, the latter not b being directly polarized by permanent contact. Electrical contact is provided by a zinc (Zn) electrode pierced with holes 2 mm in diameter. The electrochemical technique used is chronoamperometry. The electrolysis bath is based on the following constituents:

200 ml of DMF dried over $P_2O_5$ for 72 hours and then distilled under reduced pressure;
2.3 g of $Et_4NClO_4$ (electrolyte support) dried in vacuo at 80° C. for 24 hours;
60 ml of EA dried over $CaH_2$ for 48 hours and then distilled under reduced pressure;
0.1 g of short (2 to 3 mm) carbon fibres of the AS-4 type (from Hercules).

A 5 cm×5 cm Zn plate (the cathode), a counterelectrode and a pseudo-reference electrode (both the latter being made of platinum) are immersed in the electrolysis solution. A constant potential of −1.7 V (the potential of the first peak) with respect to the pseudo-reference electrode is applied to the Zn electrode for 21 hours. The short carbon fibres are polarized by stirring the solution. The presence of PEA is demonstrated macroscopically by the sticky nature of the polymer, even after repeated extraction using a good solvent for the polymer, and also microscopically by SEM (scanning electron microscopy). The percentage by weight of the polymer is determined by TGA (thermal gravimetric analysis); a value of 52% is obtained.

Of course, the invention is not limited to the embodiments described above, and many other variants may be envisaged without departing from the scope of the present invention both with regard to the nature of the conductive particles to be coated with a polymer film and with regard to the electrolysis cell to be used.

What is claimed is:

1. A process for forming a coating on conductive particles, said process comprising the steps of: grafting at least one material selected from a group consisting of a polymer and a copolymer onto these particles by using a bath containing at least one monomer from which the polymer and copolymer are formed; carrying out this grafting by electrochemical reduction of the said monomer in an electrolysis bath containing an aprotic solvent, an electrolyte support, and the monomer required to form the coating, said electrolysis bath also containing at least one cathode and one anode, putting the particles into suspension in the bath and making them move therein responsive to a current in said electrolysis bath, said movement creating intermittent contact between said particles and the cathode, and coating by polymerization on the particles being formed by applying a potential which drives an electrodialysis reaction into a passivation region corresponding to an inhibition peak detected by voltammetry, the cathode remaining insensitive to the polymerization during the application of the potential.

2. The process according to claim 1, further comprising a use of carbon particles selected from a group consisting of granules, powder and fibres.

3. The process according to claim 1, further comprising a use of metal particles selected from a group consisting of powder, granules and fibres.

4. The process according to claim 1, wherein the cathode is made of a conductive material onto which it is impossible to graft the polymer, said conductive material being selected from a group consisting of zinc, tin or silicon carbide.

5. The process according to claim 1, wherein a monomer/aprotic solvent pair is formed from a material selected from a group consisting of acrylonitrile/acetonitrile, acrylonitrile/ dimethylacetamide, acrylonitrile/N,N-dimethylformamide, acrylonitrile/pyridine, ethyl acrylate/N,N-dimethylformamide, ehtyl acrylate/pyridine, 2-trimethylsilyloxyethyl methacrylate/N,N-dimethyulformamide, methyl methacrylate/N,N-dimethylformamide, tert-butyl acrylate/N,N-dimethuylformamide, n-butyl acrylate/N,N-dimethylformamide, allyl methacrylate/N,N-dimethylformamide and glycidyl methacrylate/N,N-dimethylformamide.

6. The process according to claim 1, further comprising the steps of providing a reference electrode; setting a cathode potential with respect to a reference electrode, in the region of an inhibition peak in order to maintain conditions for electrolysis near an inhibition peak.

7. The process according to claim 1, further comprising the steps of setting the polymerization current to a value below a maximum current and keeping an approximately constant current pulse below a current for causing polymerization at a first inhibition peak, so as to avoid a second polymerization mechanism.

8. The process according to claim 1, and the further step of applying the electrolysis current continuously.

9. The process according to claim 1 and the further step of applying the electrolysis current intermittently.

* * * * *